United States Patent
López-Reina Torrijos et al.

(10) Patent No.: US 8,834,766 B2
(45) Date of Patent: Sep. 16, 2014

(54) PROTECTION OF ELEMENTS IN COMPOSITE MATERIAL

(75) Inventors: José Ignacio López-Reina Torrijos, Madrid (ES); Luis Manuel Descalzo Fernández, Madrid (ES)

(73) Assignee: Airbus Operations S.L., Madrid (ES)

( * ) Notice: Subject to any disclaimer, the term of this patent is extended or adjusted under 35 U.S.C. 154(b) by 958 days.

(21) Appl. No.: 12/380,130

(22) Filed: Feb. 24, 2009

(65) Prior Publication Data

US 2010/0025535 A1 Feb. 4, 2010

(30) Foreign Application Priority Data

Jul. 31, 2008 (ES) .................................. 200802282

(51) Int. Cl.
*B29C 70/88* (2006.01)
*B64D 45/02* (2006.01)
B29K 707/04 (2006.01)
B29K 63/00 (2006.01)

(52) U.S. Cl.
CPC ............. *B64D 45/02* (2013.01); *B29K 2707/04* (2013.01); *B29C 70/88* (2013.01); *B29K 2063/00* (2013.01)
USPC ........... 264/257; 264/258; 264/259; 264/260; 264/261

(58) Field of Classification Search
USPC .......... 264/219, 257, 259, 258, 260, 261, 324
See application file for complete search history.

(56) References Cited

U.S. PATENT DOCUMENTS

| | | | | |
|---|---|---|---|---|
| 3,989,984 A | | 11/1976 | Amason et al. | |
| 4,305,903 A | * | 12/1981 | Krause ........................ | 264/258 |
| 5,225,265 A | * | 7/1993 | Prandy et al. ................. | 428/138 |
| 5,292,475 A | * | 3/1994 | Mead et al. ................... | 264/257 |
| 5,374,780 A | * | 12/1994 | Pazdirek ....................... | 174/176 |
| 5,885,911 A | | 3/1999 | Ashcraft et al. | |
| 2005/0023727 A1 | * | 2/2005 | Sampson ...................... | 264/257 |
| 2007/0176323 A1 | * | 8/2007 | Jones et al. ................... | 264/258 |

FOREIGN PATENT DOCUMENTS

WO     WO 2009019511 A1 *  2/2009

OTHER PUBLICATIONS

Certified Foreign Priority Application, ES 200802282, certified Mar. 11, 2009.*
Verified Translation of Foreign Priority Application, ES 200802282, verified Jul. 25, 2014.*

* cited by examiner

*Primary Examiner* — Joseph S Del Sole
*Assistant Examiner* — Lawrence D Hohenbrink, Jr.
(74) *Attorney, Agent, or Firm* — Ladas & Parry LLP

(57) ABSTRACT

Protection of elements (1) of composite material protected at its points of complex geometry, such as various edges and corners, against electric discharges to which they are potentially exposed, said elements (1) being obtained by applying a cycle of temperature and pressure to a composite material arranged in a mold (2) designed in such a way that, once the geometry of the element (1) is known, the mold (2) includes free spaces (6) intended for the accumulation of resin from the process of manufacture of said element (1), and said resin will form the dielectric protection of the various edges or corners of the element (1) as it builds up, forming layers (3) that are disposed around the free edges of the element (1), thus endowing these surfaces of various edges or corners with dielectric protection of electrical insulation that prevents possible discharges and expulsion of hot particles in the case of electric discharge on said element (1). The invention also relates to a process of manufacture of an element (1) of composite material as such.

6 Claims, 2 Drawing Sheets

PROTECTION OF ELEMENTS IN COMPOSITE MATERIAL

FIELD OF THE INVENTION

The present invention relates to elements made of composite material, particularly aircraft parts, protected against electric discharges, as well as to a method of manufacture of said elements.

BACKGROUND OF THE INVENTION

Technologies based on the use of composite materials are now being used increasingly in industry for the production of components. Thus, there has been a particularly large increase in the proportion of composites being employed in the field of aeronautics, constituting the so-called aeronautical structures. However, this trend towards materials that are poor conductors relative to the traditional components in metallic materials requires exhaustive protection of them against external agents such as electric discharges, mainly, in the case of elements that make up aircraft structures, for the discharges produced by a lightning strike. This protection is of the utmost importance when the component or element in question contains fuel vapours or potentially flammable atmospheres, as is the case for the fuel tanks or the wings of an aircraft, when these last-mentioned components also perform the function of fuel tanks. In these cases, all the internal zones must be protected to prevent discharges of incandescent particles or electric arcs that could become sources of ignition.

Despite current advances in protection against lightning and other external agents that involve an electric discharge, especially in the field of aeronautics, there are great difficulties in applying the proposed theoretical elements of protection at the manufacturing stage. This problem is especially pronounced in the area of the protection of edges of complex geometry in aircraft, for which a dielectric material (electrical insulator) is required along the entire length of the edge, in order to prevent arcs and discharges. However, it proves to be highly complex, from a practical standpoint, to apply insulating products on these edges, performing the function both of physical barrier and of electrical barrier, in a robust and integral manner, and throughout the working life of the component in question.

Means for protecting the edges of components made of composite material are known in the prior art. However, these means are expensive, as they are mainly carried out manually, and moreover said manual application is very difficult. Thus, sealing elements are known at present, which are positioned on the edges of components in composite material, but they present problems of durability with the passage of time, as they lose their integrity. The application of films or layers of insulating materials on the edges of composite components is also known (said application being carried out following manufacture of the component in composite material), these films or layers usually being constituted of glass fibre or some other layer of dielectric material. This solution has the drawback that it requires a laborious and expensive additional process, and it does not adapt correctly to surfaces of difficult geometry, for example those that have curvatures.

The present invention aims to solve the problems that have just been outlined.

SUMMARY OF THE INVENTION

Thus, according to a first aspect, the present invention relates to elements, particularly of aircraft, made of composite material and protected against electric discharges to which they are potentially exposed, for example arising from a lightning strike. The invention is especially relevant to structures, in particular of aircraft, which, owing to their function of containing flammable liquids, gases or solids, must be properly protected against sources of ignition that might produce a risk of explosion.

As already mentioned, the present invention applies in particular to the aeronautical context, in which manufacture in composite materials is now very common and moreover in some cases said components fulfil the function of fuel tanks, as for example in the case of the wings and the horizontal stabilizers (trim tanks).

Thus, the invention relates to elements made of composite material protected against electric discharges, said elements comprising a layer of non-conductive, insulating resin arranged on the edges that require protection, in such a way that said layer of resin is produced in the manufacturing process proper of the element in composite material, in one go and without the need for subsequent operations for specific protection of the edges. Thus, the invention does not present any major technical limitations in its application, since the aim is to obtain protection on the edges of the elements of composite material at the same time and in the same process of manufacture of said element.

The invention assumes particular relevance in connection with the capacity for applying the resin on especially complex geometries, because it does not require an additional, special process for application of the insulating barrier, as application of the non-conductive resin is already integrated in the manufacturing process proper for the element.

According to a second aspect, the invention relates to a process for the manufacture of elements as described previously, particularly aircraft parts, made of composite material and potentially exposed to electric discharges. This process comprises the following stages:

a) Design of the element or component: the geometry of said element or component is defined without taking into account the thickness of the protection on the edges that would be difficult to apply.

b) Identification of the edges of the element or component on which protection is required based on insulation of said edges. Normally, for the invention, those edges are considered on which the application of common dielectric protection, such as sealants, glass fibre, etc. is complex, of difficult access or requires expensive manual work.

c) Definition and design of the mould in which the aircraft element or component is produced, taking into account the distances for defining the spaces identified in the edges and that require dielectric protection. A layer of non-conductive, insulating resin will be disposed in these spaces disposed on the edges, during the manufacturing process proper of the element or component in composite material.

d) Facing of the edges to level the excesses of resin to the required thickness, so as to ensure the necessary dielectric strength on said edges.

Other characteristics and advantages of the present invention will become clear from the detailed description that follows, of an application illustrating its object, referring to the accompanying drawings.

DETAILED DESCRIPTION OF THE INVENTION

Figure 1:
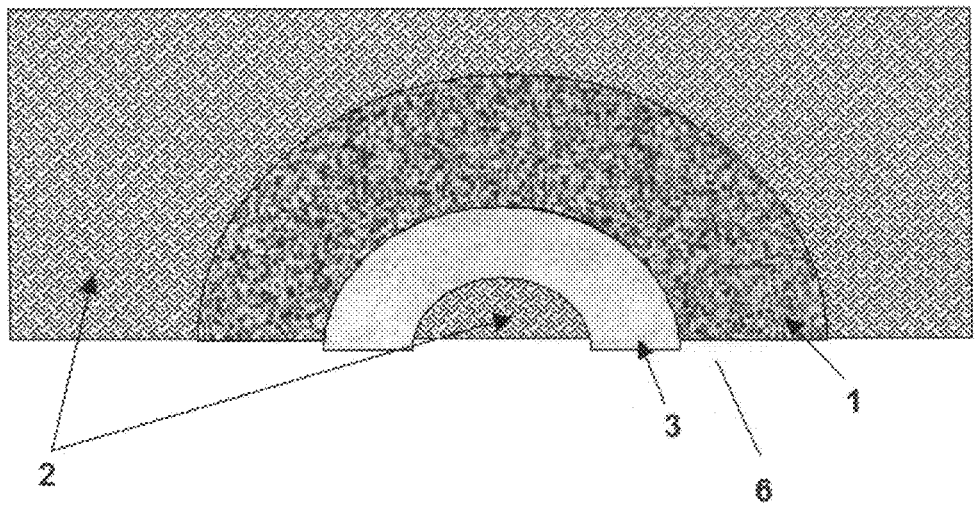
FIG. 1 shows a schematic plan view of the element made of composite material protected against electric discharges on its edges (localized accumulation of resin), according to the present invention.

According to a first aspect, the invention relates to an element manufactured in composite material and protected against electric discharges at its points of complex geometry, such as various edges and corners, where said element is manufactured in carbon-fibre composite and is mainly an element for aircraft. Often, the edges of aircraft parts potentially exposed to electric discharges must be protected with a dielectric material (electrical insulator) in order to prevent electric arcs or incandescent particles, which damage the material in unpredictable ways, causing a deterioration of its mechanical properties, or which constitute sources of ignition if located in flammable atmospheres (as in the case of fuel tanks made of carbon fibre).

The invention, although applicable in a wider context, has been developed in an aeronautical setting. The probability of a commercial aircraft suffering a lightning strike (electric discharge) is high: it is calculated that an aircraft suffers on average almost two lightning strikes per year. Therefore it is necessary to take adequate measures to ensure firstly the safety of the passengers and, secondly, that the lightning strike has the least possible effect on the operation of the aircraft.

Thus, faced with the difficulty of covering all the internal edges that could potentially cause electric discharges in an aircraft due to a lightning strike, the solution developed by the invention meets the requirement of insulating the edges electrically, by means of a robust solution of high integrity, from the electrical standpoint, as well as being simple to apply, through integration in the manufacturing process.

In the process of manufacture of composites (fibre plus resin co-cured in a thermal vacuum process) there is build-up of surplus material resulting from the flow of resin towards the ends of the part or element. The idea developed by the present invention is to utilize said surplus material of high insulating capacity (with very high dielectric strength constant) to fulfil the requirement of protection of edges against electric discharges.

Thus, using the epoxy resin that is a component of the composite material that concentrates naturally on the edges of the parts or elements produced in a controlled manner (on the basis of appropriate dimensions of the mould for the part or element and the precise amount of resin) it is possible to obtain, in one go and without the need for subsequent operations, a system for the specific protection of the edges against electric discharges.

Thus, the element 1 of composite material, said composite material being for example carbon fibre with epoxy resin, is obtained by applying a cycle of temperature and pressure on the basis of a mould 2 designed in such a way that, once the geometry of the element 1 in question is known, the mould 2 is designed so that it comprises spaces 6 intended to accommodate resin from the manufacturing process of the element 1, and said resin will form the dielectric protection of the edges of the element 1. Thus, the mould 2 includes spaces 6 on designated free edges on which dielectric (insulating) protection of the element 1 is required, thus permitting the accumulation of resin in said spaces 6 during the process of manufacture of said element 1. The resin accumulates forming a layer 3 that is disposed around the free edge of the element 1, thus endowing this edged surface with dielectric protection (electrical insulation) that prevents possible discharges and expulsion of hot particles in case of a lightning strike or equivalent severe electric discharge on said element 1.

The layer 3 of resin will need to have a thickness between 4 and 5 mm, so as to ensure a substantial dielectric or insulation capacity on the edges of said element 1.

All the resins employed for composites that are currently used for making aircraft structures are insulators, although their insulation capacity (capacity for withstanding potential differences) is greater in the latest generation of resins. A table is given below, showing the results of experimental measurements relating to resins very commonly used in the manufacture of parts in composite material for aeronautical structures. Thus, based on the values obtained, shown in this table, it can be stated that all the resins tested shown in this table are insulating from an electrical standpoint for the application of protection of edges, for example in aircraft fuel tanks. However, the greater the insulation capacity of the resin, the smaller is the thickness required in the layer 3 of resin for withstanding potential differences in the element 1.

|  | Thickness resistivity in depth (Z axis) (Ohms) | Volume resistivity (Ohms · cm) |
| --- | --- | --- |
| Resin 8552/IM7 (without resin or hardener interlayers) | 0.50 | 25.8 |
| Resin M21/IMA (with resin or hardener interlayers) | 5.6-7.7 | 287-397 |
| Resin M21E/IMA (with resin or hardener interlayers) | 9.1 | 469 |

Figure 2:
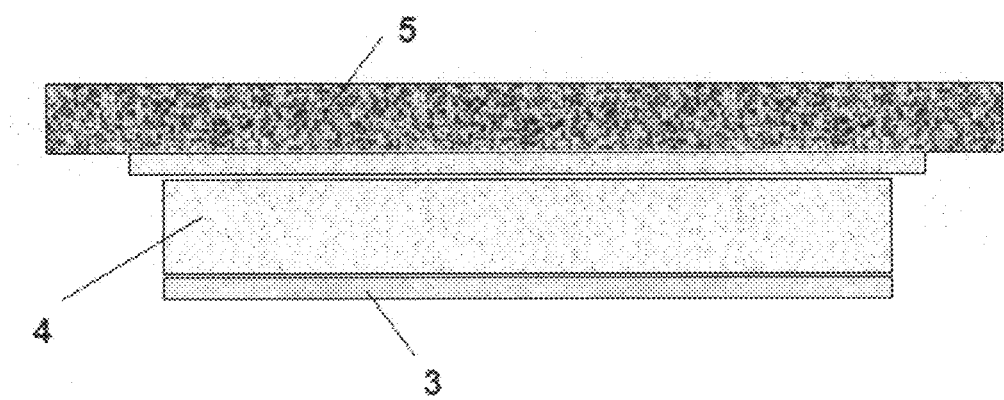
FIG. 2 shows a schematic elevation of the element made of composite material protected against electric discharges according to the present invention, in its concrete application of stringers of aircraft.
Figure 4:
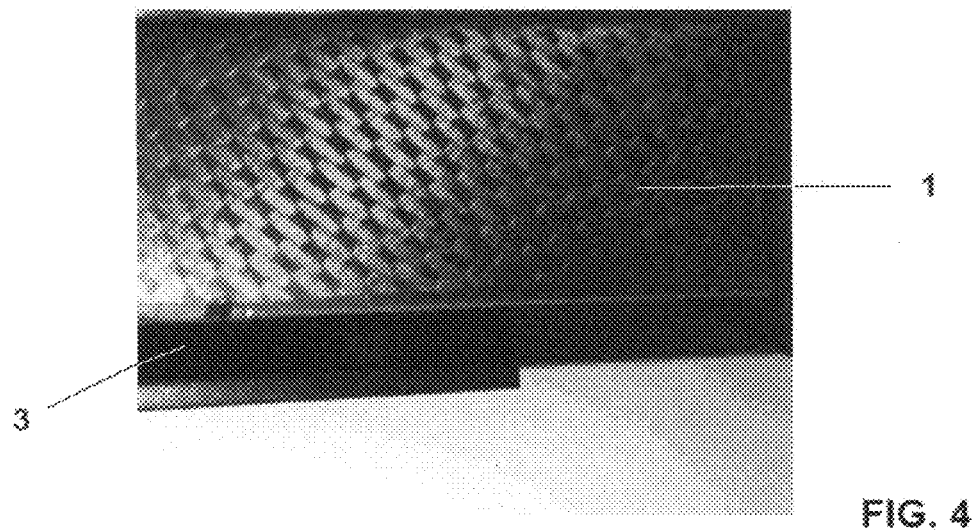
FIG. 4 shows a detail view of the edge of an element of composite material manufactured by the method of manufacture of the present invention, before the stage of facing of edges.
Figure 3:
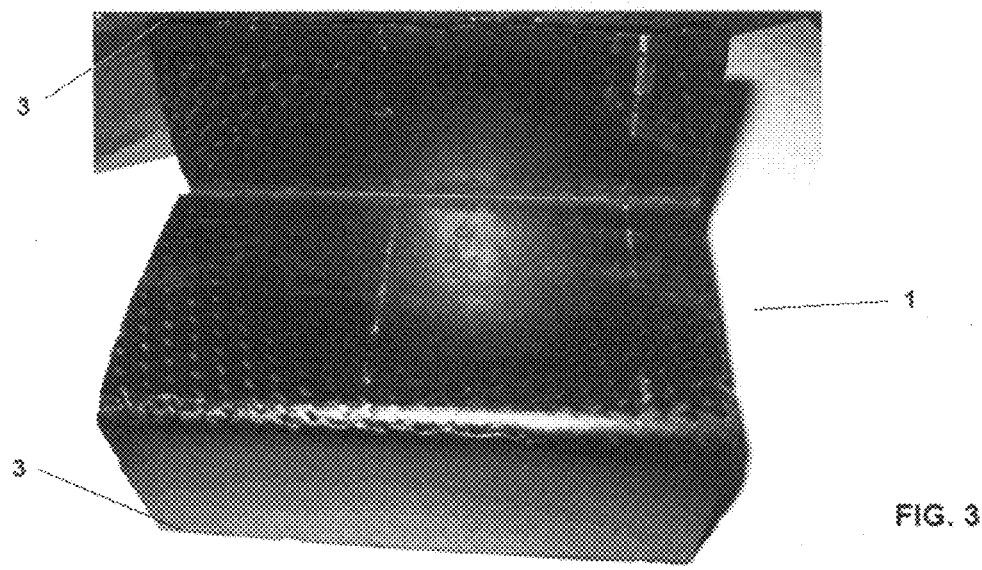
FIG. 3 shows a view of an element of composite material with extra resin manufactured in such a way that resin has accumulated, before the stage of facing of edges, according to the method of manufacture of the present invention.

FIG. 2 shows a schematic representation of the particular application of the invention for stringers 4 in composite material for aircraft, which include coverings 5 of composite material, in particular of carbon fibre.

According to a second aspect, the invention relates to a process for the manufacture of elements 1 as described previously, particularly aircraft parts, made of composite material and potentially exposed to electric discharges. This process comprises the following stages:

a) Design of the element 1: the geometry of said element 1 is defined without taking into account the thickness of the protection on the edges for which application is difficult.

b) Identification of the edges of the element 1 on which protection is required, based on insulation of said edges. Normally, for the invention, consideration is given to those edges on which the application of common dielectric protection, such as sealants, glass fibre, etc. is complex, of difficult access or requires expensive manual work.

c) Definition and design of the mould 2 in which the aircraft element 1 is produced, taking into account the distances for defining the spaces identified in the edges that require dielectric protection. A layer 3 of non-conductive, insulating resin will be disposed in these spaces disposed on the edges, during the manufacturing process proper of the element or component in composite material.

d) Facing of the edges to level the excesses of resin to the required thickness, so as to ensure the necessary dielectric strength on said edges.

Modifications that are included within the scope defined by the following claims can be introduced in the preferred embodiment that we have just described.

The invention claimed is:

1. Process of manufacture of an element of composite material wherein said element has a layer of insulating material on at least some edges or corners requiring dielectric protection in which said element is formed by application of a cycle of temperature and pressure to a composite material arranged in a mould, which process comprises the following stages:
   a) design of the element based on definition of its geometry;
   b) identification of the various edges or corners of the element on which protection is required based on insulation of said surfaces;
   c) definition of the thickness of dielectric protection required and design of a mould in which the element is to be produced, taking into account the distances required for defining spaces in the various edges or corners that require dielectric protection so as to allow space for non-conductive, insulating resin in to flow into these spaces during the manufacturing process proper of the element to produce a layer of a thickness sufficient to provide dielectric protection;
   d) placing the composite in said mould and subjecting said composite to a cycle of temperature and pressure such as to form the element and cause surplus resin to flow into said spaces; and
   e) facing of the various edges or corners of the element for levelling resin that has migrated into said spaces during said temperature and pressure cycle to produce layers of the required thickness provide the necessary dielectric strength on said surfaces.

2. Process of manufacture of an element of composite material as claimed in claim 1 wherein in step (c), the mould is designed to provide that said spaces in the various edges or corners that require dielectric protection into which resin may flow are from 4-5 mm wide and in step (d) the placing of the composite in such mould provides for spaces of from 4-5 mm width into which resin may flow.

3. A process according to claim 1, wherein the layers of resin have a thickness between 4 and 5 mm, so as to ensure a sufficient dielectric strength or insulation capacity on the various edges and corners of said element.

4. A process according to claim 1, wherein the composite material is carbon fibre with epoxy resin.

5. A process according to claim 1, wherein the element is an aircraft part.

6. A process according to claim 1 wherein in step (c) the size of the defined spaces in the various edges or corners that require dielectric protection is determined based on the insulation capacity of the resin to be employed.

* * * * *